(No Model.) 2 Sheets—Sheet 1.
L. HALL & A. PETZOLD.
CREEPER FOR HORSESHOES.
No. 572,256. Patented Dec. 1, 1896.
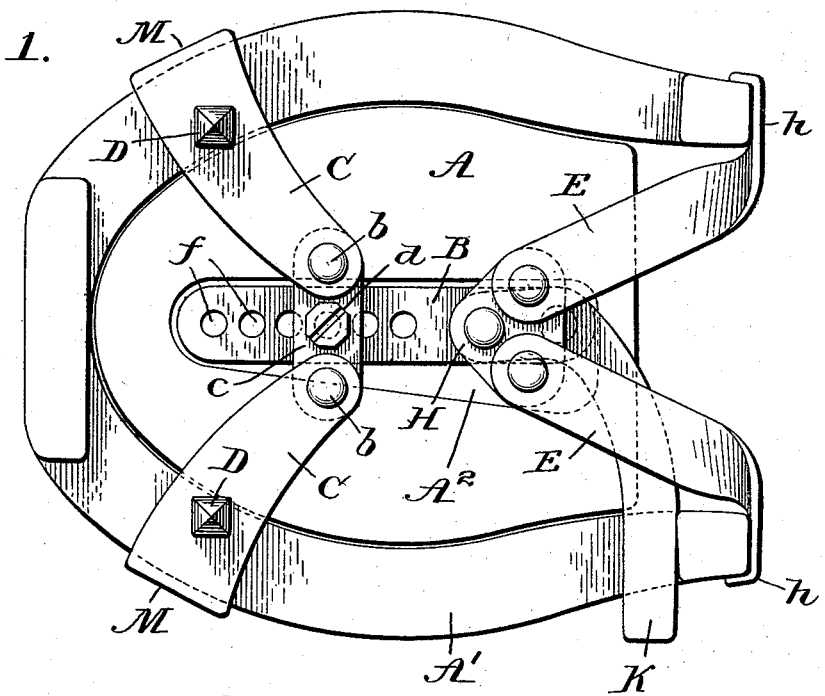
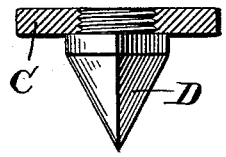
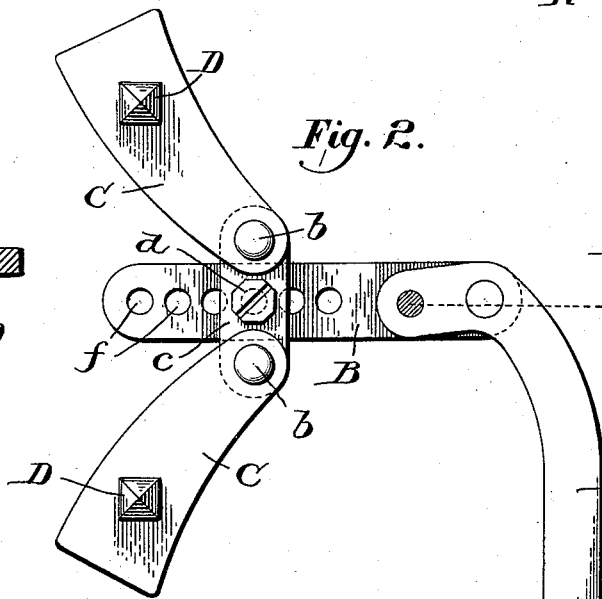
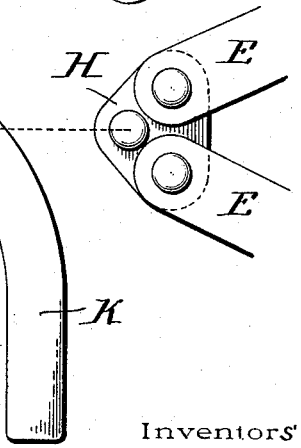
Witnesses.
A. V. Groups
J. W. Shannon
Inventors
Lynn Hall, and
Adolph Petzold
by J. N. Heaton
Attorney.

(No Model.) 2 Sheets—Sheet 2.

L. HALL & A. PETZOLD.
CREEPER FOR HORSESHOES.

No. 572,256. Patented Dec. 1, 1896.

Witnesses.
A. V. Groupe
J. W. Shannon

Inventors
Lynn Hall
Adolph Petzold
by H. N. Heaton
Attorney.

UNITED STATES PATENT OFFICE.

LYNN HALL AND ADOLPH PETZOLD, OF PHILADELPHIA, PENNSYLVANIA.

CREEPER FOR HORSESHOES.

SPECIFICATION forming part of Letters Patent No. 572,256, dated December 1, 1896.

Application filed January 11, 1896. Serial No. 575,078. (No model.)

*To all whom it may concern:*

Be it known that we, LYNN HALL and ADOLPH PETZOLD, citizens of the United States, and residents of the city of Philadelphia, in the State of Pennsylvania, have invented certain new and useful Improvements in Creepers for Horseshoes, of which the following is a full, clear, and exact description, reference being had to the accompanying drawings, forming a part of this specification.

Our invention relates to devices, commonly called "creepers," to be attached to horseshoes, and has for its object to prevent the animal slipping on the ice and also to prevent balling of snow in the frog of the hoof.

To these ends our invention consists of a device adapted to be detachably attached to the shoe after it has been secured to the hoof, the essential features of which device comprise a central longitudinal bar upon which four metal straps are pivotally mounted at one end, the other end of each strap having flanges adapted to grasp the shoe on either side of the front of the hoof and at the rear of the heels of the shoe, a locking-lever being pivotally mounted at one end to the central bar, whereby the device may be locked in place on the shoe. A filling-in plate, preferably of rubber, adapted to fill the hollow frog of the hoof is also maintained in position by the straps of the creeper, and upon the upper or forward straps screw-threaded apertures are provided, adapted to receive steel points with screw-threaded ends.

Figure 5:
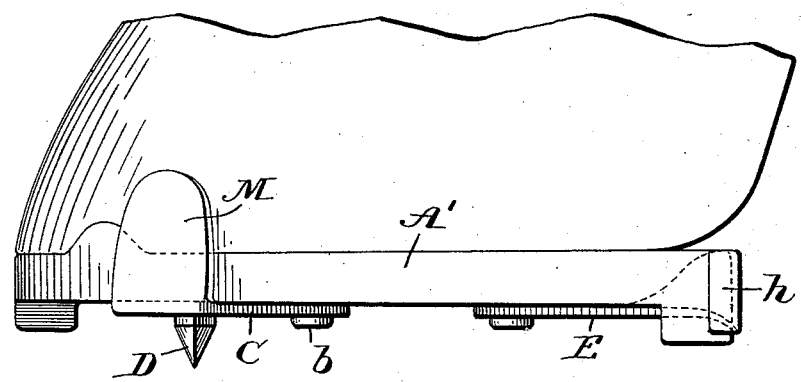
Figure 6:
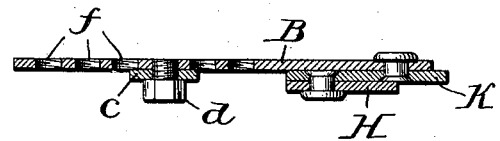
Figure 7:
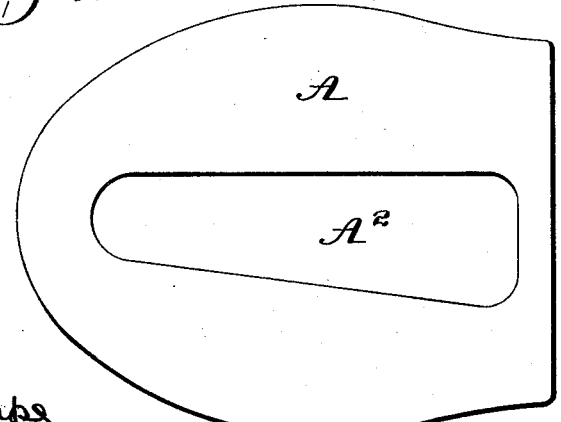

In the drawings illustrating our invention, in the several views of which like letters of reference refer to like parts, Figure 1 is a plan view of the under or outer face of the device locked in place on the horseshoe. Fig. 2 is a like view of the bar and locking-lever and the forward straps; Fig. 3, an elevation of the creeper-point and section of the strap in which it is screwed; Fig. 4, a plan of the rear locking-straps; Fig. 5, an elevation of a horse's hoof with our device in place thereon. Fig. 6 is a longitudinal section through the retaining-bar and showing the connection therewith of the attached parts, and Fig. 7 a plan of the filling-plate.

The filling-in plate (marked A and shown separately in Fig. 7) is preferably of rubber and is to conform in outline to the frog of the horse's foot and hence will fill the space within the interior of the usual iron shoe A', that is nailed fast to the hoof of the animal. This filling-plate is recessed at $A^2$ (see Fig. 7) to permit the longitudinal bar B of the creeper to be inserted therein and be flush with the filling-plate. To the said longitudinal bar B is pivoted at $b$ a pair of metallic front straps C, the pivotal connection being preferably indirectly by means of an intermediate cross-plate $c$, whereby an adjustment of the device on different sizes and shapes of horseshoes is possible, this adjustment being by means of a set-screw $d$, passing through the cross-plate $c$ into any one of a series of holes $f$ in the bar B. Said straps are provided with screw-threaded steel points, which are creeper-points, (shown at D, Figs. 1 and 2, and in detail at Fig. 3,) and not being integral with the strap can be removed, resharpened, or replaced with new ones when worn out. Said straps have flanges M, (see Figs. 1 and 5,) which hug the edge of the iron shoe and bind on the same when the bar B is pulled toward the rear of the hoof by the locking device, which latter consists of a second pair of metallic straps E E with flanges $h$, (see Figs. 1 and 5,) which bear on the heel of the shoe. These straps are pivotally connected to a plate H, which is riveted to the inner end portion of a locking-lever K, pivotally connected to the said bar B. It will be observed that a downward movement of the free end of this lever will have the effect to cause the flanged end of the front and back straps to bind the edges of the shoe and retain the device securely thereon.

Having thus described our invention, we claim as new and desire to secure by Letters Patent—

1. A device of the character and for the purpose described, consisting of a frog-plate A recessed at $A^2$, a retaining device adapted to rest within the recess of the frog-plate, and adjustable means secured to the retaining device and operating to lock the same in position on the shoe; substantially as set forth.

2. In combination, the frog-plate A recessed at $A^2$, means and retaining-straps C C pivoted thereto and adapted to bind the edges of the shoe; and metallic points D adapted to be screwed into the said straps; substantially as set forth.

3. In a creeper for horseshoes, the longitudinal retaining-bar B adapted to seat within the open portion of the horseshoe, the flanged straps C, C, adjustably pivoted thereto and having creeper projections on their lower faces, the locking-lever pivoted to said bar, the plate carried by said locking-lever, and the rear straps pivoted to said plate and having the flanged ends $h$ adapted to bear against the heel ends of the shoe, substantially as specified.

4. In combination, the longitudinal bar B, cross-bar $c$, the flanged straps C C pivoted thereto, creeper-points D carried by said straps, and a locking-lever K pivoted to the bar B and adapted by a movement of its free end to cause the flanges of the straps to bind the edges of the shoe and lock the device thereto; substantially as and for the purpose set forth.

In testimony whereof we have hereunto affixed our signatures this 16th day of December, A. D. 1895.

LYNN HALL.
ADOLPH PETZOLD.

Witnesses:
H. T. FENTON,
ANDREW ZANE.